United States Patent Office 3,014,951
Patented Dec. 26, 1961

3,014,951
PHOSPHITE-PHOSPHONATES
Gail H. Birum, Dayton, Ohio, assignor to Monsanto Chemical Company, St. Louis, Mo., a corporation of Delaware
No Drawing. Filed Dec. 15, 1958, Ser. No. 780,262
14 Claims. (Cl. 260—461)

The present invention relates to organic compounds of phosphorus and more particularly provides certain new halogen-containing phosphites of hydroxyphosphonates and the method of preparing the same, particularly from an oxirane compound, a phosphorus trihalide, and a carbonyl compound as the raw materials.

According to the invention, the present halogen-containing phosphite-phosphonates are readily and economically available by first contacting substantially five moles of an appropriate oxirane compound with substantially two moles of phosphorus trichloride or phosphorus tribromide to obtain a substantially equimolar mixture of a halogen-substituted tri-organo phosphite and a halogen-substituted di-organo phosphorochloridite or phosphorobromidite, and then contacting said mixture with an aldehyde or ketone substantially according to the scheme:

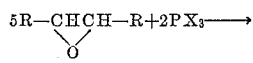

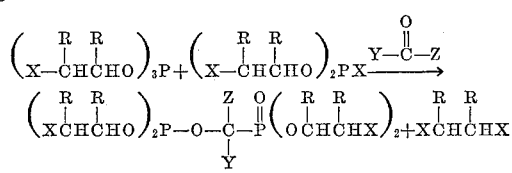

in which R is selected from the class consisting of hydrogen, alkyl, haloalkyl and alkenyl radicals of from 1 to 6 carbon atoms, the phenyl radical, and alkoxyalkyl and phenoxyalkyl radicals of from 2 to 7 carbon atoms and in which the sum of the carbon atoms in the two R radicals is less than 9; X is selected from the class consisting of chlorine and bromine; Y is selected from the class consisting of hydrogen and the radicals: alkyl of from 1 to 17 carbon atoms, alicyclic hydrocarbon which are free of α,β-unsaturation and have from 5 to 6 carbon atoms in the ring and a total of from 5 to 10 carbon atoms, benzenoid hydrocarbon which are free of olefinic and acetylenic unsaturation and have from 6 to 18 carbon atoms, furyl, and thienyl, and the said radicals carrying a substituent selected from the class containing of —CN, —NO₂, halogen, methylenedioxy, —CHO, —OH, alkyl, —COOalkyl, —Oalkyl, —Salkyl, (alkyl)₂N—, and alkyl-CONH— where alkyl denotes an alkyl radical of from 1 to 5 carbon atoms; Z is selected from the class consisting of hydrogen and the methyl radical and is methyl only when Y is an alkyl radical of from 1 to 2 carbon atoms; and Z and Y together with the carbon atom to which they are attached stand for an alicyclic ring selected from the class consisting of cycloalkylene and cycloalkenylene radicals having 6 carbon atoms in the ring and a total of from 6 to 11 carbon atoms, and being free of α,β-unsaturation.

The initial reaction constituting the present invention thus provides new compositions consisting of substantially equimolar proportions of a halogen-substituted phosphite and a halogen-substituted phosphorohalidite, which compositions are highly useful in that upon treatment with a carbonyl compound as hereinafter described, they are converted to halogen-substituted phosphite-phosphonates. The invention also provides a method of preparing the equimolar mixtures of phosphite and phosphorohalidite, the method of preparing the halogen-substituted phosphite-phosphonates from said mixtures, and the two-step process of preparing said phosphite-phosphonates from an oxirane compound, a phosphorus trihalide and a carbonyl compound as the starting materials. The invention still further provides a method of preparing the halogen-substituted phosphite-phosphonates from the carbonyl compound, a preformed halogen-substituted phosphite and a preformed halogen-substituted phosphorohalidite wherein the organo residue of the phosphite and of the phosphorohalidite are dissimilar. The invention thus provides numerous, new and valuable halogen-containing phosphites of hydroxyphosphonates which are obtainable by a variety of procedures set forth herein.

Oxirane compounds suitable for reaction with the phosphorus trichloride or phosphorus tribromide to yield the equimolar mixtures of phosphite and phosphorochloridite are, e.g., ethylene oxide and alkyl derivatives thereof such as propylene oxide, isobutylene oxide, 1,2-epoxybutane, 2,3-epoxybutane, 1,2-epoxypentane, 2,3-epoxypentane, 2,3-epoxyhexane, 1,2-epoxyhexane, 1,2-epoxyheptane, 2,3-oxy-2-ethylpentane, 1,2-epoxy-4-methylpentane, 1,2-epoxy-2-ethylhexane, 1,2-epoxy-2,4,4-trimethylpentane, 1,2-epoxy-2,3-dimethylpentane; haloalkyl-substituted oxiranes such as epichlorohydrin, epibromohydrin, epiiodohydrin, epifluorohydrin, 1,2-epoxy-4-bromobutane, 2,3-epoxy-4-chlorobutane, 1,2-epoxy-3,4-dibromobutane, 2,3-epoxy-1-bromopentane, 3,4-epoxy-2-chlorohexane, 1,2-epoxy-3,3,3-trifluoropropane, 1-bromo-2,3-epoxyheptane; the alkenyl-substituted oxiranes such as 3,4-epoxy-4-methyl-1-pentene and 3,4-epoxy-1-butene; aryl-substituted oxiranes such as (epoxyethyl)benzene, (1,2-epoxy-1-methylethyl)benzene, (3-chloro-1,2-epoxypropyl)benzene and (1,2-epoxypropyl)benzene; alkoxyalkyl- and phenoxyalkyl-substituted oxiranes such as the methyl, ethyl, isopropyl, isoamyl and phenyl ethers of glycidol, i.e., compounds of the formula

where R is methyl, ethyl, isopropyl, amyl or phenyl; (2-ethoxyethyl)ethylene oxide, etc.

Reaction of two moles of phosphorus trichloride or of phosphorus tribromide with five moles of the presently useful substituted oxiranes gives, by way of example, substantially equimolar mixtures of the following phosphites and phosphorohalidites:

(I) Tris(2-chloroethyl) phosphite and bis(2-chloroethyl) phosphorochloridite
(II) Tris(2,3-dichloropropyl) phosphite and bis(2,3-dichloropropyl) phosphorochoridite
(III) Tris(2-chloropropyl) phosphite and bis(2-chloropropyl) phosphorochloridite
(IV) Tris(2-bromoethyl) phosphite and bis(2-bromoethyl) phosphorobromidite
(V) Tris(2-bromopropyl) phosphite and bis(2-bromopropyl) phosphorobromidite
(VI) Tris(2,3-dibromopropyl) phosphite and bis(2,3-dibromopropyl) phosphorobromidite
(VII) Tris(3-bromo-2-chloropropyl) phosphite and bis(3-bromo-2-chloropropyl) phosphorochloridite
(VIII) Tris(2-bromo-3-chloropropyl) phosphite and bis(2-bromo-3-chloropropyl) phosphorobromidite
(IX) Tris(2-chlorobutyl) phosphite and bis(2-chlorobutyl) phosphorochloridite
(X) Tris(2-bromobutyl) phosphite and bis(2-bromobutyl) phosphorobromidite
(XI) Tris(2-chloro-1-methylpropyl) phosphite and bis(2-chloro-1-methylpropyl) phosphorochloridite
(XII) Tris[(1-chloromethyl)butyl] phosphite and bis[(1-chloromethyl)butyl] phosphorochloridite
(XIII) Tris[(1-bromomethyl)-tert-amyl] phosphite and bis[(1-bromomethyl)-tert-amyl] phosphorobromidite (XIV) Tris[(α-chloromethyl)benzyl] phosphite and bis [(α-chloro-methyl)benzyl] phosphorochoridite
(XV) Tris(2-chloro-2-phenylethyl) phosphite and bis (2-chloro-2-phenylethyl) phosphorochloridite
(XVI) Tris(2-bromo-2-methyl-2-phenylethyl) phosphite and bis(2-bromo-2-methyl-2-phenylethyl) phosphorobromidite
(XVII) Tris(2-chloro-3-butenyl) phosphite and bis (2-chloro-3-butenyl) phosphorochoridite
(XVIII) Tris(2-chloro-2-ethylhexyl) phosphite and bis (2-chloro-2-ethylhexyl) phosphorochloridite
(XIX) Tris(3-methoxy-2-chloropropyl) phosphite and bis(3-methoxy-2-choloropropyl) phosphorochloridite
(XX) Tris(3-phenoxy-2-bromopropyl) phosphite and bis (3-phenoxy-2-bromopropyl) phosphorochloridite
(XXI) Tris(2-chloro-4-ethoxybutyl) phosphite and bis (2-chloro-4-ethoxybutyl) phosphorochloridite
(XXII) Tris(3-iodo-2-chloropropyl) phosphite and bis (3-iodo-2-chloropropyl) phosphorochloridite Since reaction of the oxirane compound with the phosphorus trihalide proceeds through opening of the oxirane ring, there may be present in the above mixtures minor amounts of isomeric phosphite and isomeric phosphorohalidite, e.g., while in the reaction of phosphorus trichloride and propylene oxide the oxirane ring opens with preferential formation of tris(2-chloropropyl) phosphite and bis(2-chloropropyl) phosphorochloridite there may also be formed small quantities of tris(1-methyl-2-chloroethyl) phosphite and bis(1-methyl-2-chloroethyl) phosphorochloridite. The isomer content, if any, of the reaction mixture is of no consequence for the present purpose because the isomers also react with the carbonyl compound to give phosphite-phosphonates. While the small quantity of isomeric phosphite-phosphonate present in the final reaction product may be considered to constitute an impurity, it is not detrimental in practical application, for the isomers are so closely related that they possess substantially the same utility. Thus, the content of, say, a small quantity of the bis (1-methyl-2 chloroethyl) phosphite of bis(1-methyl-2-chloroethyl) (1-hydroxyethyl)phosphonate in the bis(2-chloropropyl) phosphite of bis(2-chloropropyl) (1-hydroxyethyl)phosphonate, which may be present in the reaction product of acetaldehyde and the mixture of phosphite and phosphorochloridite obtained from two moles of phosphorus trichloride and five moles of propylene oxide, generally does not limit the utility of the latter. However, if desired, the isomeric impurity may be separated by generally known isolating procedures, i.e., chromatography, crystallization, etc.

Reaction of the phosphorous trichloride or phosphorous tribromide with the presently useful oxirane compounds takes place readily, generally by simply mixing the phosphorus halide with the oxirane compound in the approximately 2:5 ratio. Depending on the nature of the individual reactants, heating may or may not be required. The addition of catalytic amounts of acids may be beneficial. Usually the reaction is exothermic, whereby cooling in order to maintain smooth reaction is advantageous. It is recommended that in such exothermic reactions the temperature be not allowed to rise above, say, from 60° C. to 80° C. An inert diluent may or may not be employed. When no diluent is used and there has been employed two moles of the phosphorus halide with five moles of the oxirane compound, the product generally consists of the substantially equimolar mixture of the halogenated tris-organo phosphite and halogenated bis-organo phosphorohalidite. Hence, no isolating procedure is required before reaction with the aldehyde or ketone for preparation of the presently provided phosphites of hydroxyphosphonic acids. However, particularly in initial runs with a hitherto unemployed oxirane compound, it is advantageous to heat the 2:5 phosphorus halide-oxirane reaction product under vacuum in order to remove any unreacted initial reactants prior to treatment with the carbonylic compound. As will be appreciated by those skilled in the art, such a procedure is not at all necessary when optimum conditions for the individual oxirane compound have been determined, i.e., when the reaction has been carried to completion. Noting cessation of change in refractive index, or of heat evolution in the case of exothermic reactions, or of change in viscosity of the reaction mass will suffice to determine when all of the initial reactants have been consumed. The main consideration in preparing the equimolar mixture of halogenated tris-organo phosphite and halogenated bis-organo phosphorohalidite is that the reactants be employed in the substantially 2:5 ratio.

Carbonylic compounds useful for the preparation of the presently provided phosphite-phosphonates from the above-described equimolar mixtures of phosphite and phosphorohalidite are generally aldehydes of from 1 to 18 carbon atoms and ketones of from 3 to 4 carbon atoms; however, the aldehydes appear to participate in the reaction much more readily than the ketones. The presently useful aldehydes have the formula

in which Y is selected from the class consisting of hydrogen and the radicals: alkyl of from 1 to 17 carbon atoms, alicyclic hydrocarbon which are free of $\alpha,\beta$-unsaturation and have from 5 to 6 carbon atoms in the ring and a total of from 5 to 10 carbon atoms, benzenoid hydrocarbon which are free of olefinic and acetylenic unsaturation and have from 6 to 18 carbon atoms, furyl, and thienyl and the said radicals carrying a substituent selected from the class consisting of —CN, —NO$_2$ halogen, —CHO, methylenedioxy, —OH, —alkyl, —COOalkyl, —Oalkyl, —Salkyl, (alkyl)$_2$N—, and alkyl-CONH— where alkyl denotes an alkyl radical of from 1 to 5 carbon atoms.

Owing to their easy availability, a particularly useful class of aldehydes includes the fatty aldehydes of from 1 to 18 carbon atoms, e.g., formaldehyde, acetaldehyde, propionaldehyde, butyraldehyde, isobutyraldehyde, valeraldehyde, isovaleraldehyde, hexanal, heptanal, 2-ethylhexanal, octanal, 2-butyloctanal, 6-methylheptantal, decanal, undecanal 2-methylundecanal, lauraldehyde, myristaldehyde, palmitaldehyde, stearaldehyde, etc.

The presence of cyano, nitro, halogen, hydroxy, formyl, methylenedioxy, alkyl, carboalkoxy, alkoxy, alkylthio-, dialkylamino, and acylamido substituents in the fatty aldehyde has no effect on the course of the reaction; hence, there may be employed such substituted fatty aldehydes as 3-cyanopropionaldehyde, chloroacetaldehyde, 3-butoxybutyraldehyde, 4-cyano-2,2 - dimethylbutyraldehyde, 2-hydroxybutyraldehyde, 3-hydroxy-2,4-dimethylvaleraldehyde, glyceraldehyde, 2,3-dichloropropionaldehyde, 3 - isopropoxypropionaldehyde, 3 - (ethylthio) - 3-methylbutyraldehyde, 2-methyl-3 - fluoropropionaldehyde, dichlorolauraldehyde, glutaraldehyde, ethyl 11-formylundecanoate, succinaldehydic acid methyl ester, ethyl 4-formylbutyrate, iodoacetaldehyde, dichloroacetaldehyde, dimethylaminoacetaldehyde, 3,3 - dichloro - 4 - dimethylamino-2-hydroxybutyraldehyde, chloral, etc.

Presently useful alicyclic carboxaldehydes include cyclohexanecarboxaldehyde, 6 - methyl - 3 - cyclohexenecarboxaldehyde, 2-cyclohexene-1-carboxaldehyde, cyclopentanecarboxaldehyde, 3 - isopropyl - 1 - methylcyclohexanecarboxaldehyde, 5 - ethoxy - 2 - cyclopentene - 1-carboxaldehyde, 1-bromo-2,2,6 - trimethylcyclohexanecarboxaldehyde, 2,2,6 - trimethylcyclohexanecarboxaldehyde, 2,2,6-trimethyl-2-cyclohexenecarboxaldehyde, etc.

The presently useful benzenoid aldehydes may be aliphatic-aromatic or purely aromatic aldehydes which may or may not be further substituted, e.g., benzaldehyde, o-, m- or p-tolualdehyde, phenylacetaldehyde, 1- or 2-naphthaldehyde, biphenyl - 4 - carboxaldehyde, hydrocinnamaldehyde, 2,3-dichlorobenzaldehyde, 4'-formylacetanilide, piperonal, 2-, 3- or 4-butoxybenzaldehyde, p-(dimethylamino)benzaldehyde, p - (ethoxy)benzaldehyde, vanillin, 2-ethoxy-4 - nitrobenzaldehyde, 3,4 - dipropoxybenzaldehyde, 4-(n-butylthio)benzaldehyde, o-, m- or p-iodobenzaldehyde, 3,4- or 3,5-dibromobenzaldehyde, 5-tert - butyl - 4 - hydroxy - m - tolualdehyde, 5 - tert-butyl-3 - nitro- o - tolualdehyde, 2 - p - cymenecarboxaldehyde, 1,8-dihydroxy-2-naphthaldehyde, 6-methoxy-2 - naphthaldehyde, 2-nitro-1-naphthaldehyde, 4'-nitro - 4 - biphenylcarboxaldehyde, 6-methoxy - 3 - biphenylcarboxaldehyde, etc.

The presently useful aldehyde may also be a heterocyclic aldehyde such as 2-, or 3-furaldehyde, 5-acetamido-2-furaldehyde, 5-bromo or chloro-2-furaldehyde, 5-nitro-2-furaldehyde, 5-methyl-2-furaldehyde, 2- or 3-thiophenecarboxaldehyde, 5-tert-butyl-2 - thiophenecarboxaldehyde, 3,5-dimethyl-2 - thiophenecarboxaldehyde, 4 - nitro - thiophenecarboxaldehyde, 2,5-dichloro - 3 - thiophenecarboxaldehyde, 2,5-diethyl-3-thiophenecarboxaldehyde, etc.

Ketones, generally, are not as reactive as the aldehydes in reacting with the equimolar mixture of tri-organo phosphite and di-organo phosphorohalidite. While virtually any aldehyde reacts with said mixture to give the presently provided halogenated phosphite-phosphonates, only the lower dialkyl ketones and certain ring ketones undergo the reaction. Useful dialkyl ketones are acetone and ethyl methyl ketone.

Useful ring ketones are the cycloalkylene and cycloalkenylene ring mono-ketones having 6 carbon atoms in the ring and a total of from 6 to 10 carbon atoms, and being free of $\alpha,\beta$-unsaturation, e.g., cyclohexanone, 3-cyclohexen-1-one, 5-isopropyl-3-methyl - 3 - cyclohexen-1-one, 2,3- or 2,5-dimethylcyclohexanone, 4-tert - butylcyclohexanone, etc.

Reaction of the above-described aldehydes or ketones with a mixture of halogenated tri-organo phosphite and halogenated diorgano phosphorohalidite is effected by simply mixing the two reactants at ordinary, decreased or increased temperature and allowing the resulting reaction mixture to stand until formation of the phosphite-phosphonate product is complete. Generally, the reaction is moderately exothermic; hence, no external heating need be customarily employed. This is particularly true when the carbonyl compound is an alkanecarboxaldehyde. With such aldehydes application of cooling is usually advantageous in order to obtain smooth reaction. When working with such active aldehydes, optimum conditions comprise gradual addition of the aldehyde to the mixture of phosphite and phosphorohalidite with application of external cooling and thorough stirring. Usually it suffices to maintain the reaction temperature at, say, from 10° C. to 50° C. during addition of the aldehyde. When all of the aldehyde has been added to the phosphite-phosphorohalidite mixture and there is no longer any evidence of exothermic reaction, completion of the reaction may be assured by heating the reaction mixture to a temperature of from, say, 50° C. to 150° C. With the more sluggish aldehydes, e.g., piperonal, 4-cyanobutyraldehyde, 3 - nitrobenzaldehyde, or 4 - (dimethylamino)benzaldehyde, it may be necessary to heat the reaction mixture moderately, say, to a temperature of about 50° C. before an exothermic reaction is initiated; employing furfural as the aldehyde reactant, even higher temperatures may be required, e.g., temperatures of from 100° C. to 150° C. appear to give the best yields. Since reactivity of the various aldehydes is thus known to vary, it is recommended that in each initial run the aldehyde and the mixture of phosphite and phosphorohalidite be mixed gradually at low temperatures and that external heating be employed only when there appears to be no spontaneous increase in temperature as a consequence of the mixing. Generally, the ketones are not so reactive as the aldehydes; accordingly, external heating is usually necessary in order to effect the reaction. Reaction of the equimolar phosphite - phosphorohalidite mixture with the carbonylic compound takes place readily in the absence of an inert diluent or catalyst. However, catalysts and diluents or solvents may be employed. The use of diluents may be particularly advantageous when working with the more reactive aldehydes; such diluents may be, e.g., benzene, toluene, dioxane, methylene chloride, or hexane. When employing no diluent and using substantially the stoichiometric proportion of reactants, i.e., one molar equivalent of the tri-organo phosphite, one molar equivalent of the di-organo phosphorohalidite and one molar equivalent of the carbonylic compound, the reaction product may be used directly for a variety of industrial and agricultural purposes without purification, i.e. it consists essentially of the phosphite-phosphonate product dissolved in the haloalkane which is produced as a byproduct in the reaction. Such solutions may be used without further purification, e.g., as gasoline additives. However, the phosphite-phosphonate is readily separated from this by-product, when desired, by volatilizing the haloalkane to give the phosphite-phosphonate as residue. If an excess of either the phosphite or the phosphorohalidite with respect to the carbonyl compound is initially present, such an excess may also be separated from the phosphite-phosphonate product by distillations.

Inasmuch as the by-product haloalkane is generally an article of commerce for which many applications exist, it will be appreciated that the present two-step process of preparing the phosphite-phosphonates from an oxirane compound, a phosphorus halide and a carbonylic compound is of pronounced economic advantage in that it entails no material-loss. Thus, while many currently employed processes for the manufacture of organic compounds of phosphorus entail substantial waste of halogen in that by-products of little commercial importance are often formed, in the present instance all of the halogen constituent of the raw materials is converted to products of economic importance.

Phosphites of hydroxy phosphonates provided by the present process from an aldehyde and a mixture of tri-organo phosphite and di-organo phosphorohalidite have the general formula

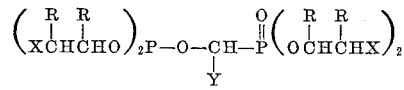

in which X is selected from the class consisting of chlorine and bromine, R is selected from the class consisting of hydrogen, alkyl, haloalkyl and alkenyl radicals of from 1 to 6 carbon atoms, the phenyl radical, and alkoxyalkyl and phenoxyalkyl radicals of from 2 to 7 carbon atoms and in which the sum of the carbon atoms in the two R radicals is from 2 to 9, and Y is selected from the class consisting of hydrogen and the radicals: alkyl of from 1 to 17 carbon atoms, alicyclic hydrocarbon which are free of $\alpha,\beta$-unsaturation and have from 5 to 6 carbon atoms in the ring and a total of from 5 to 10 carbon atoms, benzenoid hydrocarbon which are free of olefinic and acetylenic unsaturation and have from 6 to 18 carbon atoms, furyl and thienyl, and the said radicals carrying a substituent selected from the class consisting of —CN, —NO₂, halogen, methylenedioxy, —CHO, —OH, alkyl, —COOalkyl, —Oalkyl, —Salkyl, (alkyl)₂-N—, and alkylCONH— where alkyl denotes an alkyl radical of from 1 to 5 carbon atoms.

A particularly valuable class of phosphite-phosphonates of the above formula are those obtained from an aldehyde and a mixture of tris(2-chloroethyl) phosphite and bis(2-chloroethyl) phosphorohalidite, said mixture being the reaction product of two moles of phosphorus trichloride with five moles of ethylene oxide. When the carbonylic compound employed with said mixture is a fatty aldehyde of from 2 to 18 carbon atoms, the products have the formula

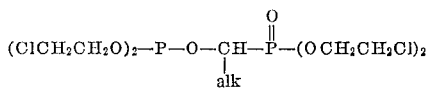

where alk denotes an alkyl radical of from 1 to 17 carbon atoms. Such products are bis(chloroethyl) phosphites of bis(chloroethyl) 1-hydroxyalkylphosphonates. The compound obtained from acetaldehyde is the bis-(chloroethyl) phosphite of bis(chloroethyl) 1-hydroxyethylphosphonate. Other bis(chloroethyl) phosphites of bis(chloroethyl) 1-hydroxyalkylphosphonates provided by the invention are those wherein the 1-hydroxyalkyl portion of the molecule is 1-hydroxypropyl (from propionaldehyde), 1-hydroxybutyl (from butyraldehyde), 1-hydroxy-2-methylpropyl (from isobutyraldehyde), 1-hydroxyamyl (from valeraldehyde), 1-hydroxyhexyl (from hexanal), 2-ethyl-1-hydroxyhexyl (from 2-ethylhexanal), 1-hydroxynonyl (from nonanal), 1-hydroxy 2-butyloctyl (from 2-butyloctanal), 1-hydroxydodecyl (from lauraldehyde), 1-hydroxytetradecyl (from myristaldehyde), and 1-hydroxyoctadecyl (from stearaldehyde).

As hereinbefore disclosed, the presence of substituent radicals in the fatty aldehyde do not effect the course of the reaction of the aldehyde with a mixture of tri-organo phosphite and di-organo phosphorohalidite. When said mixture consists of tris-(2-chloroethyl) phosphite and bis(2-chloroethyl) phosphorochloridite, there are obtained with the substituted fatty aldehydes shown below, bis(2-chloroethyl) phosphites of the following substituted bis(2-chloroethyl) 1-hydroxyalkylphosphonates:

| Aldehyde | Substituted bis(2-chloroethyl)-phosphonates |
|---|---|
| 2,3-dichloropropionaldehyde | 2,3-dichloro-1-hydroxypropyl. |
| 5-dibutylaminovaleraldehyde | 5-dibutylamino-1-hydroxyamyl. |
| 4-cyano-2-ethyl-2-methylbutyraldehyde | 4-cyano-2-ethyl-1-hydroxy-2-methylbutyl. |
| 4-methoxybutyraldehyde | 1-hydroxy-4-methoxybutyl. |
| 3-(ethylthio)propionaldehyde | 3-(ethylthio)-1-hydroxypropyl. |
| 6-hydroxyhexanal | 1,6-dihydroxyhexyl. |
| 2-bromoheptanal | 2-bromo-1-hydroxyheptyl. |
| N - (formylmethyl) - 2 - methylpropionamide. | 2-isobutyramido-1-hydroxyethyl. |
| 8-methoxyoctanal | 1-hydroxy-8-methoxyoctyl. |
| 10-fluorodecanal | 10-fluoro-1-hydroxydecyl. |
| 3-cyanopropionaldehyde | 3-cyano-1-hydroxypropyl. |
| methyl 4-formylbutyrate | 4-carbomethoxy-1-hydroxybutyl. |
| iodoacetaldehyde | 2-iodo-1-hydroxyethyl. |
| succinic dialdehyde | 3-formyl-1-hydroxypropyl. |
| phenoxyacetaldehyde | 1-hydroxy-2-phenoxyethyl. |
| 2-hydroxybutyraldehyde | 1,2-dihydroxybutyl. |

When an alicyclic carboxaldehyde, instead of a fatty aldehyde, is employed with the mixture of tris(2-chloroethyl) phosphite and bis(2-chloroethyl) phosphorochloridite, the products are bis(2-chloroethyl) phosphites of bis(2-chloroethyl) (cycloalkyl)hydroxymethylphosphonates, e.g., said mixture reacts with cyclohexanecarboxaldehyde to give the bis(2-chloroethyl) phosphite of bis-(2-chloroethyl) (cyclohexyl)hydroxymethylphosphonate and with 2-cyclopentene-1-carboxaldehyde the product is (2-cyclopentene-1-yl)hydroxymethylphosphonate. As in the aliphatic series of aldehydes, the alicyclic carboxaldehyde may be substituted or unsubstituted; thus, 2-diethylamino - 6 - methyl - 3-cyclohexene-1-carboxaldehyde gives with said mixture of bis(2-chloroethyl esters the bis(2-chloroethyl) phosphite of bis(2-chloroethyl) (2-diethylamino - 6 - methyl - 3 - cyclohexen - 1 - yl)hydroxymethylphosphonate; 2,4 - diethylcyclohexanecarboxaldehyde gives the bis(2-chloroethyl) phosphite of bis(2-chloroethyl) (2,4-diethylcyclohexyl)hydroxymethylphosphonate; and 3-cyano-1,2-dimethylcyclopentanecarboxaldehyde gives the bis(2-chloroethyl) phosphite of bis(2-chloroethyl) (3-cyano-1,2-dimethylcyclopentyl)hydroxymethylphosphonate.

Benzenoid non-unsaturated aldehides react with a mixture of tris(2-chloroethyl) phosphite and bis(2-chloroethyl) phosphorochloridite to give the bis(2-chloroethyl) phosphites of bis(2-chloroethyl) hydroxymethylphosphonates wherein the methyl radical carries a benzenoid non-unsaturated substituent. Thus, benzaldehyde gives the bis(2-chloroethyl) phosphite of bis(2-chloroethyl) (α-hydroxybenzyl)phosphonate; phenylacetaldehyde gives the bis(2-chloroethyl) phosphite of bis(2-chloroethyl) (1-hydroxy-2-phenylethyl)phosphonate; p - tolualdehyde gives the bis(2-chloroethyl) phosphite of bis(2-chloroethyl) (4-methyl-α-hydroxybenzyl)phosphonate; 1-naphthaldehyde gives the bis(2-chloroethyl) phosphite of bis(2-chloroethyl) [(1 - naphthyl)hydroxymethyl]phosphonate and 4-biphenylcarboxaldehyde gives the bis(2-chloroethyl) phosphite of bis(2-chloroethyl) [(4-biphenyl)hydroxymethyl]phosphonate. The benzenoid non-unsaturated radical may or may not be substituted by halogen, alkoxy, cyano, nitro, methylenedioxy, hydroxy, carboalkoxy, formyl, acylamino or dialkylamino groups. Examples of products obtained from a mixture of tris-(2-chloroethyl) phosphite and bis(2-chloroethyl) phosphorochloridite with variously substituted benzenoid non-unsaturated aldehydes are given below:

| Aldehyde used | bis(2-chloroethyl) phosphite of bis(2-chloroethyl) |
|---|---|
| 2,3-dichlorobenzaldehyde | (2,3-dichloro-α-hydrobenzyl)-phosphonate. |
| 2-chloro-5-nitrobenzaldehyde | (2-chloro-α-hydroxy-5-nitrobenzyl)phosphonate. |
| p-cyanobenzaldehyde | (p-cyano-α-hydroxybenzyl)-phosphonate. |
| m-bromobenzaldehyde | (α-hydroxy-m-bromobenzyl)-phosphonate. |
| salicylaldehyde | (o,α-dihydroxybenzyl)phosphonate. |
| p-isobutoxybenzaldehyde | (p - isobutoxy - α - hydroxybenzyl) - phosphonate. |
| m-(methylthio)benzaldehyde | (m-(methylthio)-α-hydroxybenzyl)-phosphonate. |
| p-diethylaminobenzaldehyde | (p - diethylamino - α - hydroxybenzyl)-phosphonate. |
| methyl phthaldehyde | (o-carbomethoxy-α-hydrobenzyl)-phosphonate. |
| piperonal | (α-hydroxypiperonyl)phosphonate. |
| vanillin | (α,3-dihydroxy-4-methoxybenzyl)-phosphonate. |
| 4'-formyl-3'-propoxyacetanilide | (4-acetamido-α-hydroxy-3-propoxybenzyl)phosphonate. |
| 2,5-dimethoxy-1-naphthaldehyde | [(2,5-dimethoxy-1-naphthyl)-hydroxymethyl]phosphonate. |
| 4-hydroxy-2-naphthaldehyde | [(4-hydroxy-2-naphthyl)hydroxymethyl]phosphonate. |
| (p-nitrophenyl)acetaldehyde | [2-(p-nitrophenyl)-1-hydroxyethyl]phosphonate. |
| hydrocinnamaldehyde | (3-phenyl-1-hydroxypropyl)-phosphonate. |
| 2-(2-biphenyl)butyraldehyde | [2-(2-biphenylyl)-1-hy-droxybutyl]phosphonate. |
| 4'-nitro-4-biphenylcarboxaldehyde | [(4'-nitro-4-biphenylyl)hydroxy-methyl]phosphonate. |
| 2,6-difluorobenzaldehyde | (2,6-difluoro-α-hydroxybenzyl)-phosphonate. |
| 1-naphthaleneacetaldehyde | [2-(1-naphthyl)-1-hydroxyethyl]-phosphonate. |
| 5-bromo-8-nitronaphthaldehyde | [(5-bromo-8-nitro-1-naphthyl)-hydroxymethyl]phosphonate. |
| 2,6-diiodo-3-methoxybenzaldehyde | (2,6-diiodo-α-hydroxy-3-methoxybenzyl)phosphonate. |
| ethyl 4-formyl-1-hydroxy-2-naphthoate. | [(3-carboethoxy-4 - hydroxy-1-naphthyl)hydroxymethyl]phosphonate. |

2- or 3-thiophenecarboxaldehyde and nuclear derivatives thereof similarly reacts with a mixture of tris(2-chloroethyl) phosphite and bis(2-chloroethyl) phosphorochloridite to give bis(2-chloroethyl) phosphites of bis-(2-chloroethyl) substituted hydroxymethylphosphonates. For example, 3-thiophenecarboxaldehyde yields the bis-(2-chloroethyl) phosphite of bis(2-chloroethyl) [(3-thienyl)hydroxymethyl]phosphonate; similarly 5-chloro-2-thiophenecarboxaldehyde gives the corresponding [(5-chloro - 2 - thienyl)hydroxymethyl]phosphonate; 3,5-dimethyl-2-thiophenecarboxaldehyde gives the corresponding [(3,5-dimethyl - 2 - thienyl)hydroxymethyl]phosphonate; 5-methoxy-2-thiophenecarboxaldehyde gives the corresponding [(5 - methoxy-2-thienyl)hydroxymethyl]-phosphonate; 5-(methylthio)-2-thiophenecarboxaldehyde gives the corresponding {[(5-methylthio)-2-thienyl]hydroxymethyl}phosphonate, and 5-acetamido-2-thiophenecarboxaldehyde gives the corresponding [(5-acetamido-2-thienyl)hydroxymethyl]phosphonate.

The furaldehydes react as do the thiophenecarboxaldehydes. Thus 2-furaldehyde, tris(2-chloroethyl) phosphite and bis(2-chloroethyl) phosphorochloridite give the bis-(2-chloroethyl) phosphite of bis(2-chloroethyl) (2-furyl-hydroxymethyl)phosphonate and with the same phosphite and phosphorochloridite, 5-bromo-, 5-nitro-, or 5-acetamido-2-furaldehyde gives the bis(2-chloroethyl) phosphite of bis(2-chloroethyl) (5-bromo-, 5-nitro-, or 5-acetamido-2-furylhydroxymethyl)phosphonate.

The use of mixtures of other halogen-substituted tri-organo phosphites and of halogen-substituted di-organo phosphorohalidites gives compounds analogous to the above except that the 2-chloroethyl, i.e., the alcohol portion of the molecule, is replaced by a radical which corresponds to the organo residue of the phosphite and phosphorohalidite. Thus, when there is employed a mixture of tris(2-bromoethyl) phosphite and bis(2-bromoethyl) phosphorobromidite the product with benzaldehyde is the bis(2-bromoethyl) phosphite of bis(2-bromoethyl) (α-hydroxybenzyl)phosphonate, and that obtained from benzaldehyde, tris(2-iodoethyl) phosphite and bis-(2-iodoethyl) phosphoroiodite is the bis(2-iodoethyl) phosphite of bis(2-iodoethyl) (α-hydroxybenzyl)phosphonate. The mixture of phosphite and phosphorochloridite obtained from two moles of phosphorus trichloride and five moles of propylene oxide, i.e., tris(2-chloropropyl) phosphite and bis(2-chloropropyl) phosphorochloridite, reacts with butyraldehyde to give the bis(2-chloropropyl) phosphite of bis(2-chloropropyl) (1-hydroxybutyl)phosphonate; with cyclohexanecarboxaldehyde to give the bis(2-chloropropyl) phosphite of bis(2-chloropropyl) (cyclohexylhydroxymethyl)phosphonate; and with 2-ethoxy-4-nitrobenzaldehyde to give the bis(2-chloropropyl) phosphite of bis(2-chloropropyl) (2-ethoxy-α-hydroxy-4-nitrobenzyl)phosphonate.

Similarly, the mixture of tris(2,3-dichloropropyl) phosphite and bis(2,3-dichloropropyl) phosphorochloridite prepared by reaction of two moles of phosphorus trichloride with five moles of epichlorohydrin reacts with, say, p-dimethylaminobenzaldehyde to give the bis(2,3-dichloropropyl) phosphite of bis(2,3-dichloropropyl) (p-dimethylamino - α - hydroxybenzyl)phosphonate; with phenylacetaldehyde to give the bis(2,3-dichloropropyl) phosphite of bis(2,3 - dichloropropyl) (2 - phenyl-1-hydroxyethyl)phosphonate; and with 4-methyl-2-thiophenecarboxaldehyde to give the bis(2,3-dichloropropyl) phosphite of bis(2,3-dichloropropyl) [(4-methyl-2-thienyl)-hydroxymethyl]phosphonate.

The mixture of tris(2-chloro-2-phenylethyl) phosphite and bis(2-chloro-2-phenylethyl) phosphorochloridite obtained by reaction of two moles of phosphorus trichloride with five moles of 2-phenylethylene oxide gives, e.g., with acetaldehyde, the bis(2-chloro-2-phenylethyl) phosphite of bis(2-chloro-2-phenylethyl) (1-hydroxyethyl)-phosphonate; with p-cyanobenzaldehyde the bis(2-chloro-2-phenylethyl) phosphite of bis(2-chloro-2-phenylethyl) (p - cyano - α - hydroxybenzyl)phosphonate; and with 1-naphthaldehyde the bis(2-chloro-2-phenylethyl) phosphite of bis(2 - chloro - 2 - phenylethyl) [(1-naphthyl)hydroxymethyl]phosphonate.

The mixture of tris(2-chloro-3-butenyl) phosphite and bis(2-chloro-3-butenyl) phosphorochloridite obtained by the reaction of two moles of phosphorus trichloride with five moles of 1,2-epoxy-3-butene also gives a phosphite of a hydroxy phosphonate when reacted with aldehydes. Thus with propionaldehyde there is obtained the bis(2-chloro-3-butenyl) phosphite of bis(2-chloro-3-butenyl) (1-hydroxypropyl) phosphonate; with p-chlorobenzaldehyde there is obtained the bis(2-chloro-3-butenyl) phosphite of (p-chloro-α-hydroxybenzyl)phosphonate; and with 2-cyclohexenecarboxaldehyde there is obtained the bis(2-chloro-3-butenyl) phosphite of bis(2-chloro-3-butenyl) [(2-cycloxenyl)hydroxymethyl]phosphonate.

Mixtures of phosphites and phosphorohalidites obtained from glycidol ethers are also advantageously employed for the preparation of the present phosphite-phosphonates. Thus the mixture of tris(3-isoamyloxy-2-chloropropyl) phosphite and bis(3-isoamyloxy-2-chloropropyl) phosphorochloridite obtained from two moles of phosphorus trichloride and five moles of the isoamyl ether of glycidol, i.e., 1,2-epoxypropyl isoamyl ether, reacts with methyl 4-formylbutyrate to give the bis(3-isoamyloxy-2-chloropropyl) phosphite of bis(3-isoamyloxy-2-chloropropyl) (4 - carbomethoxy - 1 - hydroxybutyl)phosphonate; with piperonal to give the bis(3-isoamyloxy-2-chloropropyl) phosphite of bis(3-isoamyloxy-2-chloropropyl) (α-hydroxypiperonyl) phosphonate, and with 2-furaldehyde to give the bis(3-isoamyloxy-2-chloropropyl) phosphite of bis(3-isoamyloxy-2-chloropropyl) (α-hydroxyfurfuryl)-phosphonate.

Phosphites of hydroxyphosphonates are likewise obtainable, according to the invention, by the reaction of an aldehyde with a mixture of halogenated tri-organo phosphite and halogenated di-organo phosphorohalidite in which the organo groups are dissimilar. Thus, reaction of benzaldehyde with a mixture of bis(2,3-dichloropropyl) phosphorochloridite and tris(2-chloroethyl) phosphite yields the bis(2,3-dichloropropyl) phosphite of bis-(2-chloroethyl) (α-hydroxybenzyl)phosphonate; undecylaldehyde reacts with a mixture of bis(2-chloroethyl) phosphorochloridite and tris(2-chloro-3-butenyl) phosphite to give the bis(2-chloroethyl) phosphite of bis(2-chloro - 3 - butenyl) (1 - hydroxydodecyl)phosphonate; a mixture of bis(3-methoxy-2-chloropropyl) phosphorochloridite and tris(3-phenoxy-2-bromopropyl) phosphite reacts with 3-cyanopropionaldehyde to give the bis(3-methoxy-2-chloropropyl) phosphite of bis(3-phenoxy-2-bromopropyl) 3 - cyano - 1 - hydroxypropyl phosphonate; and a mixture of bis(2-bromobutyl) phosphorobromidite and tris(2-chloro-4-ethoxybutyl) phosphite reacts with 2-furaldehyde to give the bis(2-bromobutyl) phosphite of bis(2 - chloro - 4 - ethoxybutyl) (α - hydroxyfurfuryl)-phosphonate.

As herein disclosed, the halogenated phosphite-phosphonates are also obtainable by employing, with the equimolar mixture of tri-organo phosphite and di-organo phosphorohalidite, not an aldehyde but a dialkyl ketone such as acetone or ethyl methyl ketone. The phosphite-phosphonates thus obtained have the formula

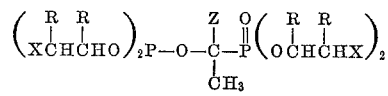

in which R is as herein defined, i.e., is selected from the class consisting of hydrogen, alkyl, haloalkyl and alkenyl radicals of from 1 to 6 carbon atoms, the phenyl radical, and alkoxyalkyl and phenoxyalkyl radicals of from 2 to 7 carbon atoms and in which the sum of the carbon atoms in the two R radicals is less than 9, X is selected from the class consisting of chlorine and bromine, and Z is methyl or ethyl. Thus reaction of acetone with a mixture of tris(2-chloroethyl) phosphite and bis(2-chloroethyl) phosphorochloridite yields the bis(2-chloroethyl) phosphite of bis(2-chloroethyl) (2-hydroxypropyl)phosphonate; with tris(2,3-dichloropropyl) phosphite and bis-(2,3-dichloropropyl) phosphorochloridite acetone yields the bis(2,3-dichloropropyl) phosphite of bis(2,3-dichloropropyl) (2-hydroxypropyl)phosphonate; and ethyl methyl ketone and a mixture of tris(2-chloro-2-phenylethyl) phosphite and bis(2-chloro-2-phenylethyl) phosphorochloridite gives the bis(2 - chloro - 2 - phenylethyl) phosphite of bis(2-chloro-2-phenylethyl) (2-hydroxybutyl)phosphonate.

Ring ketones react with a mixture of halogenated tris-organo phosphite and bis-organo phosphorohalidite to give phosphite-phosphonates of the formula

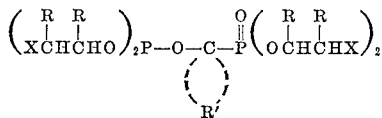

where X and R are as defined above and R' is a bivalent alkylene or alkenylene radical having 5 carbon atoms in the chain and a total of from 5 to 10 carbon atoms. Examples of phosphite phosphonates of the above formula are the bis(2-chloroethyl) phosphite of bis(2-chloroethyl) (1-hydroxycyclohexyl)phosphonate prepared from cyclohexanone and a mixture of tris(2-chloroethyl) phosphite and bis(2-chloroethyl) phosphorochloridite; the bis(2-bromopropyl) phosphite of bis(2-bromopropyl) (1 - hydroxy - 4 - methylcyclohexyl) - phosphonate prepared from tris(2-bromopropyl) phosphite and bis(2-bromopropyl) phosphorobromidite; the bis(1-chloro-3-butenyl) phosphite of bis(1-chloro-3-butenyl) (1-hydroxy-cyclohexyl)phosphonate prepared from cyclohexanone, tris(1-chloro-3-butenyl) phosphite and bis(1-chloro-3-butenyl)phosphorochloridite; the bis(3-iodo-2-chloropropyl) phosphite of bis(3-iodo-2-chloropropyl) (3-butyl-1-hydroxy-3-cyclohexenyl)phosphonate prepared from 3-cyclohexen-1-one and an equimolar mixture of tris(3-iodo-2-chloropropyl) phosphite and bis(3-iodo-2-chloropropyl) phosphorochloridite; and the bis[(α-chloromethyl)benzyl] phosphite of bis[(α-chloromethyl)-benzyl] (3-amyl-1-hydroxycyclohexyl)phosphonate prepared from tris-[(α-chloromethyl)benzyl] phosphite, bis[(α-chloromethyl)-benzyl] phosphorochloridite and 3-amylcyclohexanone.

The present halogenated phosphite-phosphonates are stable, generally high boiling liquid products which are advantageously used for a variety of industrial purposes, e.g., as lubricant and gasoline additives, as functional fluids in electrical and force-transmission applications, as rubber compounding chemicals, etc. As will be shown herein, they are particularly valuable as flame-proofing agents for cellulosic and carbonaceous, combustible materials generally.

While prior art flame-proofing materials often leave unsightly crystalline or gummy residues upon products treated therewith and often rendered textiles and other fabrics stiff and horny, the present compositions are not characterized by such deficiencies. Thus, application of the halogenated phosphite-phosphonates, e.g., to cotton cloth by padding in a solution thereof, results in a smooth, flame-proofed cloth of improved hand and of unimpaired color, resiliency and strength.

The invention is further illustrated by, but not limited, to the following examples:

Example 1

A substantially equimolar mixture of tris(-chloroethyl) phosphite and bis(2-chloroethyl) phosphorchloridite was prepared as follows:

To a reaction vessel fitted with a mechanical stirrer, thermometer, a trap-equipped condenser, and gas inlet tube, there was placed 275 g. (2.0 moles) of phosphorus trichloride. After cooling the trichloride to 10° C., ethylene oxide was introduced below the liquid surface through said tube. During the first 0.2 hour of ethylene oxide flow, the temperature of the reaction mixture rose to 19° C., but as the reaction became more exothermic, cooling by means of an ice-salt bath was employed to maintain the temperature at below 24° C. Introduction of ethylene oxide was continued for a total of 1.25 hours, at the end of which time a total of 223 g. (5.0 moles) of the oxide had been added. The resulting colorless reaction mixture was then warmed to 44° C., and then maintained under water-pump vacuum at 44° C.–41° C. for a short time. There was thus obtained 498 g. of a substantially equimolar mixture of tris(2-chloroethyl) phosphite and bis(2-chloroethyl) phosphorochloridite.

Example 2

A substantially equimolar mixture of tris(2-chloropropyl) phosphite and bis(2-chloropropyl) phosphorochloridite was prepared as follows:

To 211.2 g. (1.53 moles) of phosphorus trichloride there was added, dropwise during 1.3 hours, with stirring and at a temperature of 10–20° C., 222.3 g. (3.83 moles) of propylene oxide. The reaction was very exothermic and required constant ice-cooling to maintain the temperature below 20° C. As soon as all of the propylene oxide had been added, the temperature of the reaction mixture dropped rapidly. The mixture was then subjected to water-pump vacuum and warmed to 40° C. in order to assure complete reaction. There was thus obtained as residue 432.2 g. of the substantially equimolar mixture of tris(2-chloropropyl) phosphite and bis(2-chloropropyl) phosphorochloridite.

Example 3

In another run, propylene oxide was reacted with phosphorus trichloride as follows:

A flask equipped with a thermometer, stirrer, Dry Ice condenser and dropping funnel was charged with 604.3 g. (4.4 moles) of phosphorus trichloride, and 638.9 g. (11 moles) of propylene oxide was added thereto, dropwise during 1.7 hours while maintaining the temperature of the reaction mixture at 15–22° C. by means of ice-cooling. The resulting product consisted of a substantially equimolar mixture of tris(2-chloropropyl) phosphite and bis(2-chloropropyl) phosphorochloridite. It analyzed 31.05% carbon and 37.79% chlorine, as against 31.82% and 37.5%, the calculated values for said equimolar mixture ($C_{15}H_{30}O_5Cl_6P_2$).

Example 4

To 162.7 g. (0.6 mole) of phosphorus tribromide there was added, dropwise during 1.0 hour, with cooling and stirring, 87.2 g. (1.5 moles) of propylene oxide. The addition was initiated at 0° C., using Dry Ice—trichloroethylene as coolant. Throughout almost the entire course of addition, the temperature was maintained at from minus 2° C. to 7° C. The resulting reaction product comprised a substantially equimolar mixture of tris-(2-bromopropyl) phosphite and bis(2-bromopropyl) phosphorobromidite.

Example 5

To 275 g. (2.0 moles) of phosphorus trichloride there was added, during 45 minutes, 462 g. (5.0 moles) of epichlorohydrin. During addition of the phosphorus trichloride, the temperature of the reaction mixture stayed at 18–20° C. Shortly thereafter, however, it rose spontaneously to 30° C., whereupon ice-cooling was applied for about 45 minutes in order to maintain the temperature at this point. Cooling was then discontinued and the temperature allowed to rise spontaneously to 60° C. The reaction mixture was then allowed to stand in ice overnight. At the end of that time, the resulting colorless solution was warmed to 75° C. and concentrated to 82° C./3 mm. There was thus obtained as residue 729 g. (99% theoretical yield) of a substantially equimolar mixture of tris(2,3-dichloropropyl) phosphite and bis(2,3-dichloropropyl) phosphorochloridite, $n_D^{25}$ 1.5158.

Example 6

To 166 g. of an ice-cooled mixture consisting of equimolar quantities of tris(2-chloroethyl) phosphite and bis(2-chloroethyl) phosphorochloridite (prepared in Example 1) there was added, dropwise, 35 g. (0.333 mole) of benzaldehyde. The resulting reaction mixture was warmed to 90° C., placed under water-pump vacuum and heated to 130° C. in order to remove by-product 1,2-dichloroethane and any unreacted material, and finally distilled to remove material boiling below 150° C./0.6 mm. There was thus obtained as residue 167.8 g. (100% theoretical yield) of the substantially pure bis(2-chloroethyl) phosphite of bis(2-chloroethyl) (α-hydroxybenzyl)phosphonate, $n_D^{25}$ 1.5249, of the structure

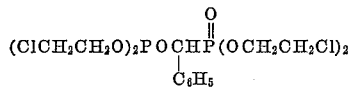

The presently obtained phosphonate analyzed as follows:

|  | Found | Calcd. for $C_{15}H_{22}Cl_4O_6P_2$ |
| --- | --- | --- |
| Percent C | 35.77 | 35.9 |
| Percent H | 4.54 | 4.4 |
| Percent Cl | 27.91 | 28.2 |
| Percent P | 12.22 | 12.35 |

Example 7

A potion (216.6 g.) of the equimolar mixture of bis(2-chloropropyl) phosphorochloridite and tris(2-chloropropyl) phosphite prepared in Example 2 was charged to a reaction vessel and there was added thereto, dropwise and with stirring, 22.3 g. (0.382 mole) of propionaldehyde. The temperature of the reaction mixture was maintained at 24–28° C. by ice-cooling. After addition of the aldehyde had been completed, the reaction mixture was heated to 75° C., subjected to water-pump vacuum, and heated to 100° C. in order to remove the more volatile by-products. There was thus collected 41.7 g. (96.5% of theory) of by-product 1,2-dichloropropane. Distillation of the residue to remove material boiling below 145° C./0.25 mm., gave as residue 194.5 g. (99.5% theoretical yield) of the substantially pure bis(2-chloropropyl) phosphite of bis(2-chloropropyl) (1-hydroxypropyl)phosphonate, $n_D^{25}$ 1.4784, of the structure

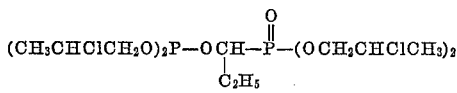

The presently provided phosphonate analyzed as follows:

|  | Found | Calcd. for $C_{15}H_{30}Cl_4O_6P_2$ |
| --- | --- | --- |
| Percent C | 35.56 | 35.28 |
| Percent H | 5.98 | 5.93 |
| Percent Cl | 27.70 | 27.79 |

Example 8

To 209.4 g. of the equimolar mixture of bis(2-chloropropyl) phosphorochloridite and tris(2-chloropropyl) phosphite prepared in Example 2, there was added, during 15 minutes, 36.3 g. (0.37 mole) of cyclohexanone, and the whole was heated to 60° C. and maintained at this temperature for a total heating time of 1.5 hours. Volatile by-products and impurities were removed from the reaction mixture by heating it to 100° C. under water-pump vacuum. Distillation in vacuo to remove material boiling below 130° C./0.2 mm., gave as residue 91.3 g. of the substantially pure bis(2-chloropropyl) phosphite of bis(2-chloropropyl) (1-hydroxycyclohexyl)phosphonate, $n_D^{25}$ 1.4712, of the structure

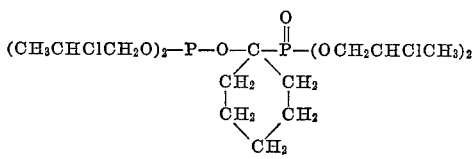

The presently provided phosphonate analyzed as follows:

|  | Found | Calcd. for $C_{18}H_{34}Cl_4O_6P_2$ |
| --- | --- | --- |
| Percent C | 40.55 | 39.4 |
| Percent H | 6.29 | 6.23 |
| Percent Cl | 25.20 | 25.79 |

Example 9

To 249.8 g. of the equimolar mixture of tris(2-bromopropyl) phosphite and bis(2-bromopropyl) phosphorobromidite, prepared in Example 4, there was added, with cooling, 13.3 g. (0.3 mole) of propionaldehyde, during a period of 0.3 hour, and at a temperature of 15–22° C. After addition of the aldehyde had been complete, external cooling was discontinued and the temperature rose rapidly to 29° C., whereupon cooling was resumed. When the temperature increase had ceased, cooling was discontinued and the mixture stirred at 25° C. for 45 minutes. It was then concentrated to 98° C./0.1 mm., to obtain as residue 210 g. of the substantially pure bis(3-bromopropyl) phosphite of bis(2-bromopropyl) (1-hydroxypropyl)phosphonate, $n_D^{25}$ 1.5161, analyzing 24.10% carbon and 4.30% hydrogen, as against 24.99% and 4.18%, the calculated values, and having the structure

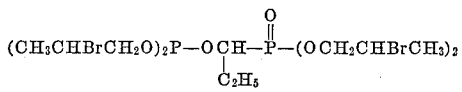

Example 10

Phenylacetaldehyde (18 g., 0.15 mole) and 110.5 g. of the substantially equimolar mixture of bis(2,3-dichloropropyl) phosphorochloridite and tris(2,3-dichloropropyl) phosphite prepared in Example 5 were placed in a 500 cc. flask and stirred. The temperature increased spontaneously to 44° C. The reaction mixture was then warmed to 90° C. and concentrated to a pot temperature of 150° C./1.0 mm., to give as residue 118.0 g. of the substantially pure bis(2,3-dichloropropyl) phosphite of bis(2,3-dichloropropyl) (1 - hydroxy-2-phenylethyl)phosphonate, $n_D^{25}$ 1.5304, and having the structure

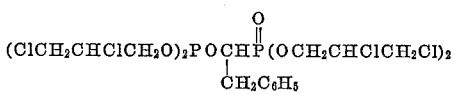

Example 11

To 147.5 g. of the substantially equimolar mixture of bis(2,3-dichloropropyl) phosphorochloridite and tris(2,3-dichloropropyl) phosphite of Example 5, there was added, with cooling during 0.2 hour, 24.5 g. of propionaldehyde. When addition was complete, the reaction mixture was warmed to 120° C. and concentrated to a pot temperature of 150° C./1.0 mm., to give as residue 138 g. of the substantially pure bis(2,3-dichloropropyl) phosphite of bis(2,3 - dichloropropyl) (1-hydroxypropyl)phosphonate, $n_D^{25}$ 1.5044, and having the structure

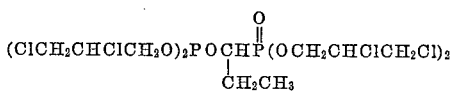

Example 12

To 243.8 g. of an equimolar mixture consisting of bis(2-chloroethyl)phosphorochloridite and tris(2-chloroethyl) phosphite there was added, during 0.3 hour, 30.8 g. (0.7 mole) of acetaldehyde. During addition of the aldehyde, the temperature of the reaction mixture was maintained by ice-cooling at 10–15° C. After all of the aldehyde had been added, cooling was required for several minutes in order to maintain the temperature of the mixture below 20° C. It was then stirred at room temperature for one hour and allowed to stand overnight. Concentration to a pot temperature of 102° C./1.0 mm., gave as residue 219 g. (100% theoretical yield) of the substantially pure bis(2-chloroethyl) phosphite of bis(2-chloroethyl) (1-hydroxyethyl)phosphonate, $n_D^{25}$ 1.4904, of the structure

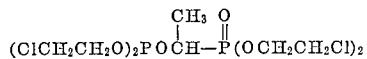

The presently provided phosphonate analyzed as follows:

|  | Found | Calcd. for $C_{10}H_{20}Cl_4O_6P_2$ |
|---|---|---|
| Percent C | 28.16 | 27.3 |
| Percent H | 4.78 | 4.6 |
| Percent P | 13.23 | 14.1 |

Example 13

To a 2,000 ml. flask equipped with a stirrer, thermometer, reflux condenser fitted with a drying tube, and a dropping funnel there was charged an equimolar mixture (total of 1,320 g.) of bis(2-chloroethyl) phosphorochloridite and tris(2-chloroethyl) phosphite. After cooling the mixture to 2° C., there was added, dropwise, during 0.45 hour, 168.1 g. (3.82 moles) of acetaldehyde. During addition of the aldehyde, extraneous cooling was discontinued momentarily to facilitate initiation of the reaction, but when the temperature reached 14° C., cooling was again employed and the remainder of the aldehyde was added while maintaining the temperature of the reaction mixture at from 10° C. to 16° C. When all of the aldehyde had been added, the mixture was stirred at room temperature for one hour, during which period the temperature rose to 30° C. The whole was then heated to 60° C., subjected to water-pump vacuum, and subsequently heated to 110° C. in order to remove 255.8 g. of by-product 1,2-dichloroethane and unreacted material. Concentration of the residue to 140° C./0.15 mm., gave 1,188.3 g. of the substantially pure bis(2-chloroethyl) phosphite of bis(2-chloroethyl) (1-hydroxyethyl)phosphonate, $n_D^{25}$ 1.4906, of the structure

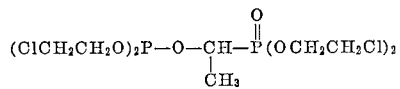

The presently provided phosphonate analyzed 28.45% carbon and 5.07% hydrogen as compared to 27.38% and 4.57%, the calculated values.

Example 14

To 223.8 g. of an equimolar mixture of bis(2-chloroethyl) phosphorochloridite and tris(2-chloroethyl) phosphite there was added, dropwise with stirring, 27.1 g. (0.47 mole) of redistilled propionaldehyde. During addition of the aldehyde, cooling was applied when the temperature of the reaction mixture reached 30° C., and the remainder of the aldehyde was added at a temperature of 20–28° C. The whole was heated to 75° C. to insure complete reaction, and then placed under water-pump vacuum and heated to 90° C. for removal of impurities and by-products. Concentration of the residue to 140° C./0.1 mm., gave as residue 201.2 g. (98.5% theoretical yield) of the substantially pure bis(2-chloroethyl) phosphite of bis(2-chloroethyl) (1-hydroxypropyl)phosphonate, $n_D^{25}$ 1.4910, of the structure

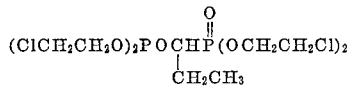

The presently provided phosphonate analyzed 29.12% carbon and 5.22% hydrogen as against 29.15% and 4.88%, the calculated values.

Example 15

To 178.9 g. of an equimolar mixture consisting of bis(2-chloroethyl) phosphorochloridite and tris(2-chloroethyl) phosphite there was added, with cooling during 0.3 hour, 32.6 g. (0.45 mole) of n-butyraldehyde. During addition of the aldehyde, the temperature of the reaction mixture was maintained at 15–22° C. and after all of the aldehyde had been added, cooling was necessary for a few minutes in order to keep the temperature of the reaction mixture below room temperature. The colorless reaction mixture was then warmed to 65° C. and concentrated to a pot temperature of 145° C./0.2 mm., to give as residue 172.0 g. of the substantially pure bis(2-chloroethyl) phosphite of bis(2-chloroethyl) (1-hydroxybutyl)phosphonate, $n_D^{25}$ 1.4880, of the structure

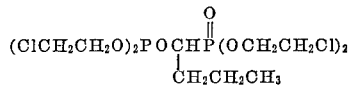

Example 16

2-ethylhexaldehyde (64.1 g., 0.50 mole) was added, with cooling and during an 0.2-hour period, to 245 g. of a substantially equimolar mixture of bis(2-chloroethyl) phosphorochloridite and tris(2-chloroethyl) phosphite. The exothermal nature of the reaction was evidenced by the fact that the temperature of the reaction mixture rose to 43° C. when all of the aldehyde had been added and ice-cooling was discontinued. The reaction mixture was then warmed at 95–103° C. for a period of 0.3 hour and distilled to remove material boiling below 182° C./1 mm. The residue was taken up in toluene, washed with aqueous sodium bicarbonate and then with water, dried, and finally concentrated to a pot temperature of 151° C./0.05 mm., to give as residue the substantially pure bis(2-chloroethyl) phosphite of bis(2-chloroethyl) (2-ethyl-1-hydroxyhexyl)phosphonate, $n_D^{25}$ 1.4858, analyzing 11.93% phosphorus as against a theoretical of 11.8%.

Example 17

To 198 g. of an equimolar mixture consisting of bis(2-chloroethyl) phosphorochloridite and tris(2-chloroethyl) phosphite there was added, during 0.1 hour and with cooling, 51.3 g. (0.4 mole) of 2-ethylhexaldehyde. When all of the aldehyde had been added, cooling was discontinued, and the whole stirred until cessation in temperature rise (40° C. maximum). Subsequent concentration of the reaction mixture to a pot temperature of 140° C./0.1 mm., gave as residue 207.1 g. (99% theoretical yield) of the substantially pure bis(2-chloroethyl) phosphite of bis(2-chloroethyl) (2-ethyl-1-hydroxyhexyl)phosphonate, $n_D^{25}$ 1.4858, of the structure

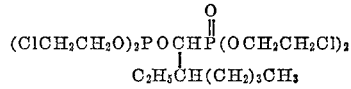

The presently obtained phosphonate analyzed as follows:

|  | Found | Calcd. for $C_{16}H_{32}Cl_4O_6P_2$ |
|---|---|---|
| Percent C | 36.57 | 36.7 |
| Percent H | 6.26 | 6.15 |
| Percent Cl | 27.32 | 27.1 |
| Percent P | 12.01 | 11.8 |

Example 18

To 198 g. of an equimolar mixture consisting of bis(2-chloroethyl) phosphorochloridite and tris(2-chloroethyl) phosphite there was added, with cooling during 0.2 hour, 68.2 g. (0.4 mole) of undecylaldehyde. After all of the aldehyde had been added, cooling was discontinued and the temperature of the reaction mixture increased spontaneously to 40° C. Concentration to a pot temperature of 148° C./0.2 mm., gave as residue 226.0 g. (100% theoretical yield) of the substantially pure bis(2-chloroethyl) phosphite of bis(2-chloroethyl) (1-hydroxyundecyl)phosphonate, $n_D^{25}$ 1.4808, of the structure

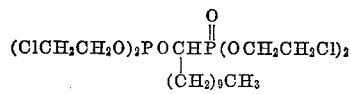

The presently provided phosphonate analyzed as follows:

|  | Found | Calcd. for $C_{19}H_{38}Cl_4O_6P_2$ |
|---|---|---|
| Percent C | 39.77 | 40.3 |
| Percent H | 6.72 | 6.8 |
| Percent Cl | 25.15 | 25.1 |

Example 19

A mixture consisting of 12.5 g. (0.1 mole) of 2,2-dimethyl-4-cyanobutyraldehyde and 49.5 g. of a substantially equimolar mixture of bis(2-chloroethyl) phosphorochloridite and tris-(2-chloroethyl) phosphite was gradually warmed to 156° C. and then concentrated to a pot temperature of 130° C./0.5 mm., to give as residue 43.0 g. of the substantially pure bis(2-chloroethyl) phosphite of bis(2-chloroethyl) (4-cyano-2,2-dimethyl-1-hydroxybutyl) phosphonate, $n_D^{25}$ 1.4950, and having the structure

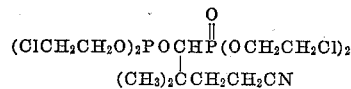

Example 20

Glutaraldehyde (22.5 g., 0.225 mole) was added, during a period of 0.1 hour at 15–20° C., to 245 g. of an equimolar mixture of bis(2-chloroethyl) phosphorochloridite and tris(2-chloroethyl) phosphite. The temperature of the colorless reaction mixture rose exothermally to 44° C. Completion of the reaction was effected by warming the mixture for one hour at 90–100° C. Distillation to remove material boiling below a maximum pot temperature of 191° C./1.2 mm., gave as residue 131.7 g. of the substantially pure bis(2-chloroethyl) phosphite of bis(2-chloroethyl) (1-hydroxy-4-formyl-butyl)-phosphonate of the following structure

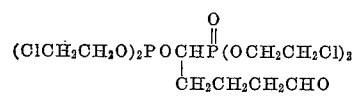

The presently obtained phosphonate analyzed as follows:

|  | Found | Calcd. for $C_{13}H_{24}Cl_4O_7P_2$ |
|---|---|---|
| Percent C | 30.22 | 31.5 |
| Percent H | 5.10 | 4.9 |
| Percent Cl | 28.44 | 28.6 |

Example 21

Ethyl 4-formylbutyrate (14.4 g., 0.1 mole) and 49.5 g. of an equimolar mixture of bis(2-chloroethyl) phosphorochloridite and tris(2-chloroethyl) phosphite were placed in a flask and allowed to stand while the temperature rose spontaneously to 72° C. When there was no further evidence of exothermic reaction, the mixture was warmed to 120° C. and distilled to a pot temperature of 140° C./2.0 mm., to give as residue 54.0 g. (100% theoretical yield) of the substantially pure bis(2-chloroethyl) phosphite of bis(2-chloroethyl) (4-carboethoxy-1-hydroxybutyl)phosphonate, $n_D^{25}$ 1.4856, and having the structure

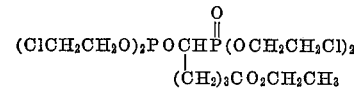

Example 22

Benzaldehyde (45.6 g., 0.43 mole) was added, dropwise with stirring during a period of 0.8 hour, to 198.9 g. of an equimolar mixture of bis(2-chloroethyl) phosphorochloridite and tris(2-chloroethyl) phosphite. After one-third of the benzaldehyde had been added, the temperature of the reaction mixture had risen to 34° C.; at this point, the mixture was cooled to 19° C. and by the time the remainder of the aldehyde was added, the temperature rose to 35° C. In order to insure complete reaction, the mixture was heated to 75° C., then placed under water-pump vacuum and heated to 105° C. in order to remove volatile impurities and by-products. Concentration of the residue to 140° C./0.1 mm., gave 199.6 g. (99.3% theoretical yield) of the substantially pure bis-(2-chloroethyl) phosphite of bis(2-chloroethyl) (α-hydroxybenzyl)-phosphonate $n_D^{25}$ 1.5290, of the structure

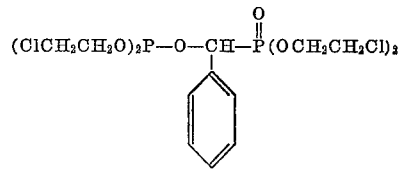

The presently provided phosphonate analyzed as follows:

|  | Found | Calcd. for $C_{15}H_{22}Cl_4O_6P_2$ |
|---|---|---|
| Percent C | 36.43 | 35.89 |
| Percent H | 4.54 | 4.42 |
| Percent Cl | 27.12 | 28.21 |

Example 23

To a mixture consisting of 49.5 g. of bis(2-chloroethyl) phosphorochloridite and tris(2-chloroethyl) phosphite in substantially equimolar proportions, there was added 12.0 g. (0.1 mole) of 4-tolualdehyde. The temperature of the reaction mixture increased from 25° C. to 60° C. during addition of the aldehyde. The whole was then warmed to 130° C. and concentrated to a pot temperature of 40° C./1.0 mm., to give as residue 52.1 g. of the substantially pure bis(2-chloroethyl) phosphite of bis(2-chloroethyl) (α-hydroxy-4-methylbenzyl)phosphonate, $n_D^{25}$ 1.5169 and having the structure

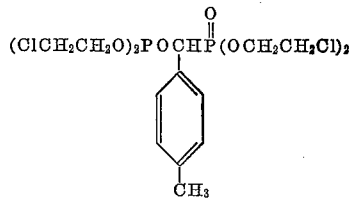

Example 24

To 49.5 g. of a substantially equimolar mixture of bis-(2-chloroethyl) phosphorochloridite and tris(2-chloroethyl) phosphite there was gradually added 15.1 g. (0.1 mole) of 3-nitrobenzaldehyde. The whole was warmed to about 40° C. at which point an exothermic reaction was initiated and heating was discontinued while the temperature rose spontaneously to 72° C. When no further rise in temperature was observed, the reaction mixture was heated to 120° C. and then concentrated to a pot temperature of 126° C./1.0 mm., to give as residue 57.2 g. of the substantially pure bis(2-chloroethyl) phosphite of bis(2 - chloroethyl) (3-nitro-α-hydroxy-benzyl)phosphonate, $n_D^{25}$ 1.5300, and having the structure

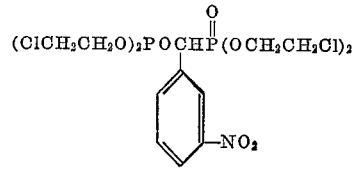

Example 25

An equimolar mixture consisting of 2,4-dichlorobenzaldehyde, bis(2-chloroethyl) phosphorochloridite and tris(2-chloroethyl) phosphite was allowed to stand while the temperature rose spontaneously to 42° C. It was then warmed to 120° C. and concentrated to a pot temperature of 148° C./1.0 mm., to give as residue 42.1 g. (94% theoretical yield) of the substantially pure bis(2-chloroethyl) phosphite of bis(2-chloroethyl) (2,4-dichloro-α-hydroxybenzyl)phosphonate, $n_D^{25}$ 1.5295, and having the structure

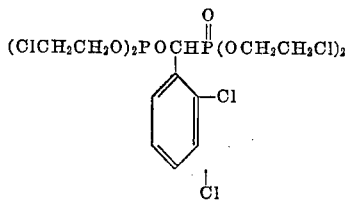

Example 26

A mixture consisting of 49.5 g. of a substantially equimolar mixture of bis(2-chloroethyl) phosphorochloridite and tris(2-chloroethyl) phosphite was treated with 15.2 g. (0.1 mole) of vanillin. The temperature of the reaction mixture increased spontaneously from 25° C. to 80° C. When no further temperature rise was observed, the mixture was warmed to 124° C. and concentrated to 130° C./0.2 mm., to give as residue 55.8 g. of the substantially pure bis(2-chloroethyl) phosphite of bis(2-chloroethyl) (α,4 - dihydroxy - 3 - methoxybenzyl)phosphonate, $n_D^{25}$ 1.5289, and having the structure

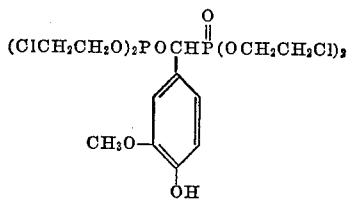

Example 27

To 49.5 g. of a substantially equimolar mixture of bis(2-chloroethyl) phosphorochloridite and tris(2-chloroethyl) phosphite there was gradually added 14.9 g. (0.1 mole) of 4-(dimethylamino)benzaldehyde. When the mixture was warmed to about 50° C., an exothermic reaction was initiated and the temperature increased spontaneously to 124° C. It was then concentrated to a pot temperature of 140° C./1.0 mm., to give as residue the substantially pure bis(2-chloroethyl) phosphite of bis(2-chloroethyl) [4-dimethylamino)-α-hydroxylbenzyl]-phosphonate, $n_D^{25}$ 1.5452, and having the structure

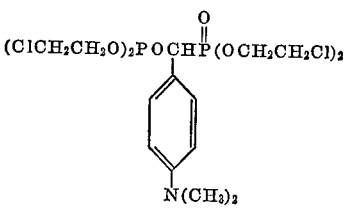

Example 28

The addition of 16.3 g. of (0.1 mole) of 4-acetamidobenzaldehyde to 49.5 g. of a substantially equimolar mixture of bis(2-chloroethyl) phosphorochloridite and tris(2-chloroethyl) phosphite caused no noticeable heat of reaction at room temperature. When warmed, an exothermic reaction was initiated and the temperature increased to 124° C. When no further temperature rise was observed, the whole was concentrated to 144° C./1.0 mm., to give as residue 56.2 g. (100% theoretical yield) of the substantially pure bis(2-chloroethyl) phosphite of bis(2-chloroethyl) (4-acetamido-α-hydroxybenzyl)phosphonate, $n_D^{25}$ 1.5409, and having the structure

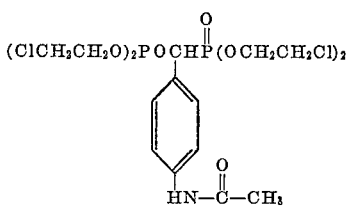

Example 29

Piperonal (15.0 g., 0.1 mole) and 24.7 g. of a substantially equimolar mixture of bis(2-chloroethyl) phosphorochloridite and tris(2-chloroethyl) phosphite were placed in a 100 cc. flask and warmed to about 40° C., at which point an exothermic reaction was initiated and the temperature was allowed to increase spontaneously to 55° C. When the exothermic reaction had ceased, the mixture was warmed to a pot temperature of 140° C./1 mm., to give as residue 25.5 g. (94% theoretical yield) of the substantially pure bis(2-chloroethyl) phosphite of bis(2-chloroethyl) (α-hydroxypiperonyl)phosphonate, $n_D^{25}$ 1.5330, and having the structure

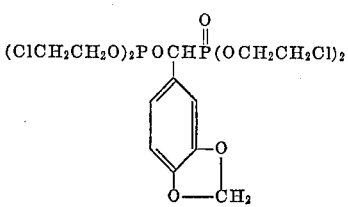

Example 30

Furfural (9.6 g., 0.1 mole) was gradually added to 49.5 g. of a substantially equimolar mixture of bis(2-chloroethyl) phosphorochloridite and tris(2-chloroethyl) phosphite. No exothermic reaction was noted. When all of the aldehyde had been added, the whole was heated to 124° C. and concentrated to a pot temperature of 136° C./1.0 mm., to give as residue 48.6 g. (95% theoretical yield) of the substantially pure bis(2-chloroethyl) phosphite of bis(2-chloroethyl) (α-hydroxyfurfuryl)phosphonate, $n_D^{25}$ 1.5069, and having the structure

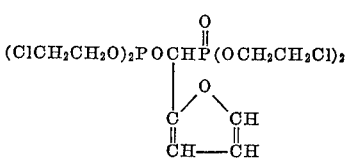

Example 31

6-methyl-3-cyclohexenecarboxaldehyde (12.3 g., 0.1 mole) was gradually added to 33.0 g. of an equimolar mixture of bis(2-chloroethyl) phosphorochloridite and tris(2-chloroethyl) phosphite. During addition of the aldehyde, the temperature of the reaction mixture rose from 26° C. to 46° C. The resulting reaction mixture was then warmed to 136° C. and concentrated to a pot temperature of 140° C./1.0 mm., to give as residue 34.0 g. (98% theoretical yield) of the substantially pure bis(2-chloroethyl) phosphite of bis(2-chloroethyl) [(6-methyl-3-cyclohexenyl)hydroxymethyl]phosphonate, $n_D^{25}$ 1.5034, and having the structure

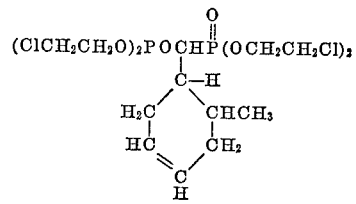

Example 32

To about 488.5 g. of a substantially equimolar mixture of bis(2-chloroethyl) phosphorochloridite and tris(2-choroethyl) phosphite there was added 100 g. (1.02 moles) of cyclohexanone at a temperature of 22–24.5° C. The whole was stirred at room temperature for 0.5 hour and then at 49–50° C. for 0.3 hour. There was thus obtained an ethylene dichloride solution of the substantially pure bis(2-chloroethyl) phosphite of bis(2-chloroethyl) (1-hydroxycyclohexyl)phosphonate of the structure

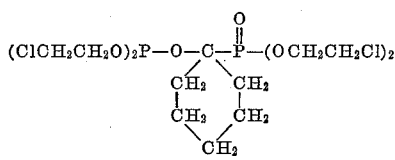

The above structure was confirmed by nuclear magnetic resonance studies conducted on said solution. NMR chemical shifts for phosphorus showed characteristic positions for the phosphite and phosphonate structures.

Example 33

To a cooled mixture consisting of 145 g. (1.05 moles) of phosphorus trichloride and 300 ml. of methylene chloride there was added, during one hour at 20–25° C., 184.5 g. (2.64 moles) of butadiene monoxide. The resulting mixture was stirred at room temperature for 30 minutes and then concentrated first under water-pump vacuum and finally to 55° C./4 mm., to give as residue 320.5 g. (97.5% theoretical yield) of a substantially equimolar mixture of tris(2-chloro-3-butenyl) phosphite and bis(2-chloro-3-butenyl) phosphorochloridite.

A 156.3 g. portion of the above mixture (containing about 0.25 mole each of said phosphite and said phosphorochloridite) was treated with 17.4 g. (0.30 mole) of propionaldehyde for about 12 minutes at 20–30° C. Upon warming the whole to 75° C. and concentrating to a pot temperature of 105° C./2 mm., there was obtained as residue the substantially pure bis(2-chloro-3-butenyl) phosphite of bis(2-chloro-3-butenyl) (1-hydroxypropyl)phosphonate.

Example 34

123.8 g. of a substantially equimolar mixture of tris(2-chloroethyl) phosphite and bis(2-chloroethyl) phosphorochloridite was warmed to 50° C. and 14.4 g. of formaldehyde which had been depolymerized by heating, was distilled into the mixture while applying external cooling to maintain the temperature at between 55–65° C. Concentration to 142° C./1.0 mm., gave as residue 109.4 g. of the substantially pure bis(2-chloroethyl) phosphite of bis(2-chloroethyl) (hydroxymethyl)phosphonate. During the concentration, 25.1 g. of by-product ethylene chloride was obtained in the trap which formed a part of the reaction equipment.

Example 35

To a solution of 93.7 g. (0.683 mole) of phosphorus trichloride in 175 ml. of methylene chloride, there was added 198.3 g. (1.71 moles) of isopropyl glycidyl ether over a 45-minute period while maintaining the temperature of the reaction mixture at between 17–35° C. The whole was then stirred at room temperature for about 30 minutes to obtain a substantially equimolar mixture of tris(2-chloro-3-isopropoxypropyl) phosphite and bis(2-chloro-3-isopropoxypropyl) phosphorochloridite.

After a 6.0 g. portion of said mixture had been removed for analysis the remainder of the mixture of phosphite and phosphorochloridite was reacted with propionaldehyde by adding the aldehyde (28 g., 0.49 mole) thereto during about 12 minutes at 22–30° C. while employing moderate cooling. When all of the aldehyde had been added and cooling was discontinued, the temperature of the reaction mixture rose spontaneously to 54° C. When no further increase in temperature was noted, the whole was warmed to 58° C. and maintained at this temperature for 30 minutes. Concentration first at water-pump vacuum and then to 140° C./2.0 mm., gave as residue 238.2 g. of the substantially pure bis(2-chloro-3-isopropoxypropyl) phosphite of bis(2-chloro-3-isopropoxypropyl) (1 - hydroxypropyl)phosphonate, analyzing 19.11% chlorine as against 20.5%, the calculated value for $C_{27}H_{54}Cl_4O_{10}P_2$.

Example 36

To 123.8 g. of a substantially equimolar mixture consisting of 0.25 mole each of tris(2-chloroethyl) phosphite and bis(2-chloroethyl) phosphorochloridite there was added in one portion, 18 g. (0.30 mole) of methyl ethyl ketone. The temperature rose from 24° C. to 27° C. The reaction mixture was then warmed at 100–110° C. for two hours and distilled to give as residue 59.2 g. of the substantially pure bis(2-chloroethyl) phosphite of bis(2-chloroethyl) (1 - hydroxy-1-methylpropyl)phosphonate.

Example 37

To 123.8 g. of a substantially equimolar mixture consisting of 0.25 mole each of tris(2-chloroethyl) phosphite and bis(2-chloroethyl) phosphorochloridite there was added, during about 12 minutes, 58 g. of a 55% solution of 2,3-dichloropropionaldehyde in benzene. External cooling was applied to maintain the reaction temperature at between 25–30° C. When all of the aldehyde had been added, the mixture was warmed to 80° C. and distilled to a maximum pot temperature of 152° C./0.2 mm., to give the substantially pure bis(2-chloroethyl) phosphite of bis(2-chloroethyl) (2,3-dichloro - 1 - hydroxypropyl)-phosphonate.

Example 38

To a solution of 68.7 g. (0.50 mole) of phosphorus trichloride in 150 ml. of methylene chloride there was added, during about 25 minutes, 120.1 g. (1.0 mole) of (epoxyethyl)benzene while maintaining the temperature of the reaction mixture at from 13–20° C. The whole was then stirred at room temperature for 30 minutes to obtain the substantially pure bis(2-chloro-2-phenylethyl) phosphorochloridite.

To the above obtained phosphorochloridite, there was added 135 g. (0.50 mole) of tris(2-chloroethyl) phosphite and to the resulting mixture there was introduced during about 18 minutes, 33 g. (0.57 mole) of propionaldehyde. External cooling was applied in order to maintain the temperature of the reaction mixture at 25–28° C. during addition of the aldehyde. The whole was then refluxed (58° C.) for 30 minutes and concentrated under water-pump pressure to 70° C. Distillation to remove material boiling below 120° C./0.3 mm., gave as residue 302.1 g. (99.7% theoretical yield) of the substantially pure bis(2-chloro-2-phenylethyl) phosphite of bis(2-chloroethyl) (1-hydroxypropyl)phosphonate.

Example 39

To 94 g. of a substantially equimolar mixture consisting of 0.166 mole each of bis(2-chloropropyl) phosphorochloridite and tris(2-chloropropyl) phosphite, there was added 11.6 g. of acetone. A slight temperature rise (25.5–27.0° C.) was observed. The whole was refluxed (95–112° C.) for 14 hours and then distilled to remove material boiling below 132° C./0.1 mm. There was thus obtained as residue 34.3 g. of the substantially pure bis(2-chloropropyl) phosphite of bis(2-chloropropyl) (1-hydroxy-1-methylethyl)phosphonate.

Example 40

To 124 g. of a substantially equimolar mixture consisting of about 0.25 mole each of tris(2-chloroethyl) phosphite and bis(2-chloroethyl) phosphorochloridite, there was added, during about 12 minutes, 36.9 g. (0.25 mole) of chloral. External cooling was employed to maintain the exothermic reaction at 22–30° C. When all of the aldehyde had been added, the reaction mixture was warmed to 70° C. and then distilled to remove material boiling below 142° C./0.1 mm. There was thus obtained as residue 120.1 g. (88.5% theoretical yield) of the substantially pure bis(2-chloroethyl) phosphite of bis(2-chloroethyl) (1-hydroxy-3,3,3-trichloroethyl)phosphonate, analyzing 22.05% carbon and 3.54% hydrogen as against 22.1% and 3.15%, the respective calculated values for $C_{10}H_{17}Cl_7O_6P_2$.

Example 41

Phosphorus trichloride (137.3 g., 1.0 mole) and 300 ml. of methylene chloride were placed in a reaction vessel and stirred as 376 g. (2.5 moles) of phenyl glycidyl ether was added thereto, during 1.25 hours at 22–30° C. Because reaction appeared to be very slow at first, after addition of about 60 g. of the ether, about 5 drops of 85% phosphoric acid was added to the reaction mixture in order to accelerate the reaction. When all of the ether had been added, the whole was warmed to reflux (54° C.) to obtain a substantially equimolar mixture of tris(2-chloro-3-phenoxypropyl) phosphite and bis(2-chloro-3-phenoxypropyl) phosphorochloridite.

To all but 5 g. of the above mixture of phosphite and phosphorochloridite, there was added, during about 12 minutes, 31.9 g. (0.55 mole) of propionaldehyde while maintaining the temperature of the reaction mixture at 25–30° C. When all of the aldehyde had been added and cooling was discontinued, the temperature of the reaction mixture rose spontaneously to 38° C. The whole was then warmed to reflux (54° C.), concentrated to water-pump pressure to 97° C., and finally distilled to remove material boiling below 114° C./0.2 mm. There was thus obtained as residue 477 g. of the substantially pure bis(2-chloro-3-phenoxypropyl)phosphite of bis(2-chloro-3-phenoxypropyl) (1-hydroxypropyl)phosphonate.

Example 42

To 85 g. of a substantially equimolar mixture consisting of about 0.15 mole each of tris(2-chloropropyl) phosphite and bis(2-chloropropyl)phosphorochloridite, there was added 17.0 g. (0.15 mole) of dichloroacetaldehyde while maintaining the temperature of the reaction mixture at from 22–30° C. The whole was then warmed to 80° C. and distilled to remove material boiling below a pot temperature of 165° C./0.20 mm., to give as residue 59.4 g. of the substantially pure bis(2-chloropropyl) phosphite of bis(2-chloropropyl) (1-hydroxy-2,2-dichloroethyl)phosphonate.

Example 43

To 226.1 g. (0.4 mole) of a substantially equimolar mixture of tris(2-chloropropyl) phosphite and bis(2-chloropropyl) phosphorochloridite, prepared as described in Example 2, there was added, with cooling, 20.7 g. of acetaldehyde (0.44 mole) at a temperature of 10–13° C. during 10 minutes. When all of the aldehyde had been added, cooling was discontinued and the reaction mixture was stirred at room temperature for 0.3 hour. During this time the temperature reached 85° C. before cooling brought it under control. The reaction mixture was then warmed to 85° C. to insure complete reaction, then placed under vacuum and concentrated to remove material boiling below 120° C./0.7 mm. There was thus obtained as residue 198.6 g. (100% theoretical yield) of the substantially pure bis(2-chloropropyl) phosphite of bis(2-chloropropyl) (1-hydroxyethyl)phosphonate, $n_D^{25}$ 1.4782, of the structure

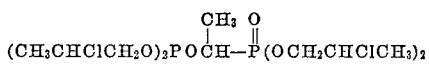

and analyzing as follows:

| | Found | Calcd. for $C_{14}H_{28}Cl_4O_6P_2$ |
|---|---|---|
| Percent C | 33.66 | 33.86 |
| Percent H | 5.96 | 5.68 |
| Percent Cl | 28.95 | 28.51 |

Example 44

The bis(2-chloroethyl) phosphite of bis(2-chloroethyl) (1-hydroxyethyl)phosphonate prepared in Example 13 was tested for flame-proofing efficiency as follows:

A 2 x 12 inch strip of desized Indian Head cotton cloth was padded with a 15% acetone solution of said phosphonate and dried at room temperature to constant weight. The weight increase of the treated cloth was 20.5%. When held in an open flame, the dried, treated cloth did not support combustion and the length of charring was less than 1.0 inch, i.e., well within the limits set forth by the textile flame-proofing test D626–55T of the American Society for Testing Materials. The hand of the treated cloth was smooth and non-harsh and its color had been not at all affected by the treatment.

Similar testing of the bis(2-chloropropyl) phosphite of bis(2-chloropropyl) (1-hydroxypropyl) phosphonate prepared as in Example 7 also showed very good flame-proofing efficiency. When held in the open flame, the treated cloth did not support combustion and gave a char length of only 0.75 inch. Also, when a Whatman No. 1 filter paper was impregnated with the same compound and submitted to the same test, there was obtained a non-flammable paper which charred only limitedly.

The use of bis(2,3-dichloropropyl) phosphite of bis(2,3-dichloropropyl) (1-hydroxypropyl)phosphonate of Example 11 in the flame-proofing test gave a char length of only 0.25 inch. The treated non-flammable cloth was of excellent hand and color. Treatment of the Indian Head cloth was acetone, alone, resulted in readily ignitible, highly flammable material.

The presently provided halogenated phosphite-phosphonates generally have very good flame-proofing effects. While the above example shows application to only cotton cloth and cellulosic paper, the present compounds likewise serve as fire-retardants for combustible materials in general. They are advantageously employed as flame-proofing agents in electrical insulating coatings, e.g., in combination with chlorinated rubber, as fire-retardant additives to spontaneously combustible powders such as the starches and sugars, and as the active ingredients of flame-proofing coatings for christmas trees and ornamentations of cellulosic origin, e.g., wall-board, fiber board and insulating board, employed in home or shop window displays under fire-susceptible conditions. An especially interesting utility of the present halogenated phosphite-phosphonates which stems from the fire-retardant effects thereof involves incorporation thereof into highly carbonaceous heat-transfer media and insulating impregnants. Use of the present phosphite-phosphonates in very small, regulated quantities for the purpose of controlling burning rates of highly ignitible, explosive materials, e.g., rocket propellants, is feasible.

What I claim is:
1. The compound of the formula

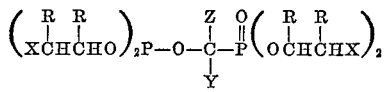

in which R is selected from the class consisting of hydrogen, alkyl, haloalkyl and alkenyl radicals of from 1 to 6 carbon atoms, the phenyl radical, and alkoxyalkyl and phenoxyalkyl radicals of from 2 to 7 carbon atoms and in which the sum of the carbon atoms in the two R radicals is less than 9; X is selected from the class consisting of chlorine and bromine; Y is selected from the class consisting of hydrogen, and the radicals: alkyl of from 1 to 17 carbon atoms, alicyclic hydrocarbon which are free of α,β-unsaturation and have from 5 to 6 carbon atoms in the ring and a total of from 5 to 10 carbon atoms, benzenoid hydrocarbon which are free of olefinic and acetylenic unsaturation and have from 6 to 18 carbon atoms, furyl, and thienyl, and the said radicals carrying a substituent selected from the class consisting of —CN, —NO₂, halogen, methylenedioxy, —CHO, —OH, alkyl, —COOalkyl, —Oalkyl, —Salkyl, (alkyl)₂N—, and alkylCONH— where alkyl denotes an alkyl radical of from 1 to 5 carbon atoms; Z is selected from the class consisting of hydrogen and the methyl radical and is methyl only when Y is an alkyl radical of from 1 to 2 carbon atoms; and Z and Y together with the carbon atom to which they are attached stand for an alicyclic ring selected from the class consisting of cycloalkylene and cycloalkenylene radicals having 6 carbon atoms in the ring and a total of from 6 to 11 carbon atoms, and being free of α,β-unsaturation.

2. The compound of the formula

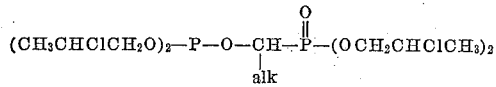

wherein alk is an alkyl radical of from 1 to 17 carbon atoms.

3. The bis(2-chloroethyl) phosphite of bis(2-chloroethyl) (α-hydroxybenzyl)phosphonate of the structure

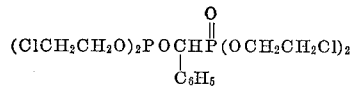

4. The bis(2-chloropropyl) phosphite of bis(2-chloropropyl) (1-hydroxypropyl)phosphonate of the structure

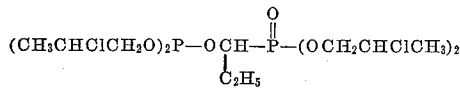

5. The bis(2,3-dichloropropyl) phosphite of bis(2,3-dichloropropyl) (1-hydroxypropyl)phosphonate of the structure

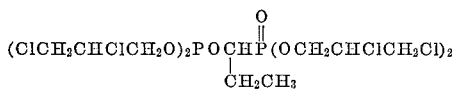

6. The bis(2-chloroethyl) phosphite of bis(2-chloroethyl) (1-hydroxyethyl)phosphonate of the structure

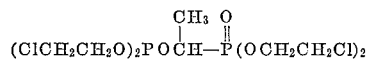

7. The bis(2-chloroethyl) phosphite of bis(2-chloroethyl) (1-hydroxypropyl)phosphonate of the structure

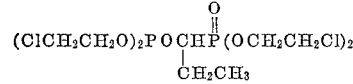

8. The bis(2-chloropropyl) phosphite of bis(2-chloropropyl) (1-hydroxyethyl)phosphonate of the formula

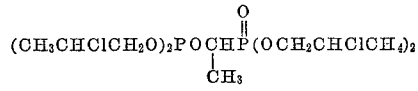

9. The compound of the formula

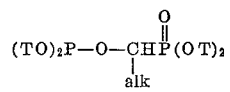

in which T is a haloalkyl radical of from 2 to 10 carbon atoms and alk denotes an alkyl radical of from 1 to 17 carbon atoms.

10. The compound of the formula

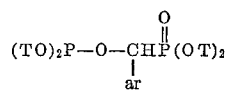

in which T is a haloalkyl radical of from 2 to 10 carbon atoms and ar denotes a benzenoid hydrocarbon radical which is free of olefinic and acetylenic unsaturation and has from 6 to 18 carbon atoms.

11. A compound of the formula

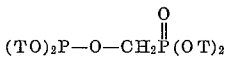

in which T is a haloalkyl radical of from 2 to 10 carbon atoms.

12. A compound of the formula

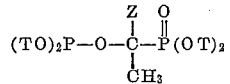

in which T is a haloalkyl radical of from 2 to 10 carbon atoms and Z is an alkyl radical of from 1 to 2 carbon atoms.

13. A compound of the formula

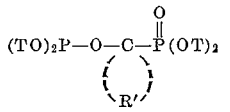

in which T is a haloalkyl radical of from 2 to 10 carbon atoms and R' is a bivalent alkylene radical having 5 carbon atoms in the chain and a total of from 5 to 10 carbon atoms.

14. A compound of the formula

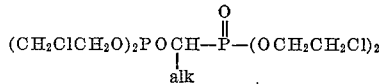

in which alk denotes an alkyl radical of from 1 to 17 carbon atoms.

References Cited in the file of this patent
UNITED STATES PATENTS

| | | |
|---|---|---|
| 2,451,375 | Bell | Oct. 12, 1948 |
| 2,852,533 | Brenner et al. | Sept. 16, 1958 |
| 2,870,190 | Burgert et al. | Jan. 20, 1959 |
| 2,874,166 | Dixon | Feb. 17, 1959 |
| 2,878,266 | Wachs et al. | Mar. 17, 1959 |
| 2,883,411 | Lanham | Apr. 21, 1959 |
| 2,888,464 | Shapiro et al. | May 26, 1959 |

FOREIGN PATENTS

| | | |
|---|---|---|
| 797,970 | Great Britain | July 9, 1958 |

OTHER REFERENCES

Abramov et al.: "J. Gen. Chem.," U.S.S.R. p. 269–271, vol. 23, (1953).

Abstracting an Article in Zhur. Obshchei Khim., vol. 23, p. 257–62 (1953).

Abramov et al.: "Chemical Abstracts," vol. 48, p. 2572C, 1954.

UNITED STATES PATENT OFFICE
CERTIFICATE OF CORRECTION

Patent No. 3,014,951　　　　　　　　　　　　　　December 26, 1961

Gail H. Birum

It is hereby certified that error appears in the above numbered patent requiring correction and that the said Letters Patent should read as corrected below.

Column 1, line 49, for "containing" read -- consisting --; column 2, line 20, for "oxy-2-ethylpentane" read -- epoxy-3-ethylpentane --; line 22, for "-dimethylpentane" read -- -dimethylheptane --; column 3, line 15, for "phosphorochloridite" read -- phosphorobromidite --; column 5, line 18, for "4-nitro-thio-" read -- 4-nitro-2-thio- --; column 8, in the table, column 2, lines 1 and 17 thereof, for "-hydrobenzyl)-", each occurrence, read -- -hydroxybenzyl)- --; same table, column 1, line 17 thereof, for "2-(2-biphenyl)-butyraldehyde" read -- 2-(2-biphenylyl)butyraldehyde --; column 13, line 24, for "potion" read -- portion --.

Signed and sealed this 11th day of September 1962.

(SEAL)
Attest:

ERNEST W. SWIDER　　　　　　　　　　　　　　DAVID L. LADD
Attesting Officer　　　　　　　　　　　　　　Commissioner of Patents

UNITED STATES PATENT OFFICE
CERTIFICATE OF CORRECTION

Patent No. 3,014,951                  December 26, 1961

Gail H. Birum

It is hereby certified that error appears in the above numbered patent requiring correction and that the said Letters Patent should read as corrected below.

Column 1, line 49, for "containing" read -- consisting --; column 2, line 20, for "oxy-2-ethylpentane" read -- epoxy-3-ethylpentane --; line 22, for "-dimethylpentane" read -- -dimethylheptane --; column 3, line 15, for "phosphorochloridite" read -- phosphorobromidite --; column 5, line 18, for "4-nitro-thio-" read -- 4-nitro-2-thio- --; column 8, in the table, column 2, lines 1 and 17 thereof, for "-hydrobenzyl)-", each occurrence, read -- -hydroxybenzyl)- --; same table, column 1, line 17 thereof, for "2-(2-biphenyl)-butyraldehyde" read -- 2-(2-biphenylyl)butyraldehyde --; column 13, line 24, for "potion" read -- portion --.

Signed and sealed this 11th day of September 1962.

(SEAL)
Attest:
ERNEST W. SWIDER
Attesting Officer

DAVID L. LADD
Commissioner of Patents